J. H. BIGELOW.

Corn Popper.

No. 3,821. Reissued Feb. 8, 1870.

BEST AVAILABLE COPY

Witnesses:

Albert E. Pierce

Geo H. Miller

Inventor:

J. H. Bigelow

N. PETERS, Photo-Lithographer, Washington, D. C.

BEST AVAILABLE COPY

United States Patent Office.

J. H. BIGELOW, OF WORCESTER, MASSACHUSETTS.

*Letters Patent No.* 93,271, *dated August* 3, 1869; *reissue No.* 3,821, *dated February* 8, 1870.

CORN-POPPER.

The Schedule referred to in these Letters Patent and making part of the same.

*Know all men by these presents:*

That I, J. H. BIGELOW, of the city and county of Worcester, and Commonwealth of Massachusetts, have invented certain new and useful Improvements in Corn-Poppers; and I do hereby declare that the following is a full, clear, and exact description of the same, reference being had to the accompanying drawings, forming a part of this specification, in which—

Figure 1:
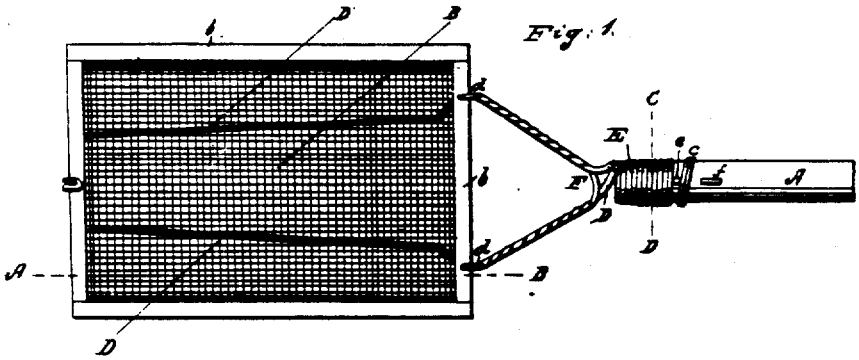
Figure 1 represents a plan view of my improved corn-popper.

To enable those skilled in the art to which my invention belongs to make and use the same, I will proceed to describe it more in detail.

The nature of my invention consists—

First, in the arrangement, between the wooden handle of the popper and the wire popping-box, of a coiled-wire socket or ferrule, the coils of wire forming screw-threads for holding the handle.

Second, combining the wire socket or ferrule and its connections with the popping-box, in such a manner that the strain, in lifting or using the popper, shall be borne by the metallic flange around the upper edge of the popper and the wires which support or pass under the bottom of the popper.

Third, the combination of the wire socket or ferrule with the popping-box by means of wire connections.

Fourth, connecting the small end of the wire socket or ferrule to the metal flange around the top of the popping-box by wire connections, which extend laterally from the front of the small end of the socket or ferrule to the points where they connect or hook into the metal flange or binding on the upper edge of the popping-box.

Fifth, the combination, with the wire socket or ferrule and handle, of a retaining-pin, as hereafter explained.

In the drawings—

The part marked A is the handle, the rear end being shown broken off, and

B, the popping-box, which is made of netted or woven wire.

The upper edge of the popping-box is provided with a metal binding-piece, *a*, which is properly secured to the netting of which the box is made.

The cover C is made of wire netting or cloth, and is also provided with a metal flange or binding, *b*.

The connection betweeen the popping-box and handle is formed, in this instance, as follows:

A piece of wire, D, of suitable dimensions, is doubled together in the centre, as shown at *c*, and a portion of its length is formed into a conical socket or ferrule, E, the two strands being wound spirally together, thus forming a screw-thread, into which the end of the handle can be screwed, as indicated in the drawings, when the poppet is to be used.

At the small end of the socket or ferrule E, the strands are separated, and a second piece of wire, F, is placed across them, and its ends twisted in with the wire D, thereby forming a firm connection between the ferrule or socket E and wire F.

The ends of the wire F extend out laterally from the front or small end of the socket, and are provided with hooks, *d*, which hook into holes in the binding metal piece *a*, upon the back side of the popper-box, and near each side of the same.

The hooks *d* also pass through holes in the metal flange or binding-piece of the cover, thus forming hinges for the latter.

The ends of the wire D pass down back of the popper-box under the bottom, thence up on the front end, and are hooked into the metal flange or binding-piece on the front upper edge of the popper-box.

The end of the handle A is turned, to fit the conical socket or ferrule E, and in which socket (when it is screwed or inserted) it is retained by a wire, *e*, which projects between the two first coils of the spiral socket-piece or ferrule.

The wire *e* is made in form of a staple, with one of its sides longer than the other.

Two holes are formed in the handle A, in which the staple is inserted from the lower side, and driven through the handle.

Figure 2:
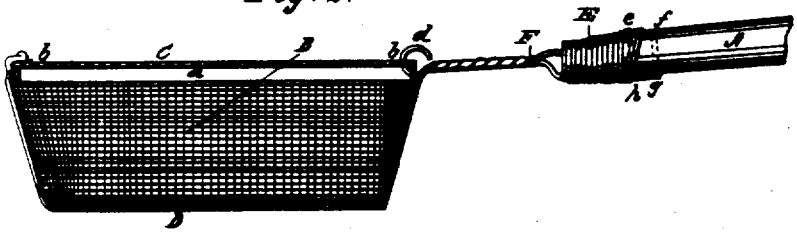
Figure 2 represents a longitudinal section, at line A B, fig. 1.
Figure 3:
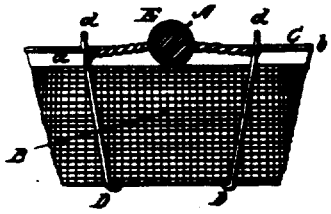
Figure 3 represents a section, on line C D, fig. 1.

The long arm *f* is clinched down, as indicated in dotted lines, fig. 2, whereby the wire is prevented from being drawn out, and, at the same time, the back of the staple *g* strikes against the wood of the handle A, which prevents it from being driven further in, thus forming a shoulder, *h*, against which the large or open end of the socket or ferrule strikes when the handle is screwed in, as indicated in fig. 2.

It will thus be seen that a close connection can be formed between the handle and socket-piece.

By my mode of constructing the attachment, the handle may be readily detached from the other portions of the popper by simply unscrewing it from the spiral ferrule. In this way, the poppers can be closely packed, for shipment, and easily put together by the buyer, without the use of separate nails or screws.

It will be observed that the connection of the coiled wire socket or ferrule with the popping-box is such that the strain, in lifting or using the popper, will come upon and be borne by the metal flange or binding upon the upper edge of the box, and upon the wires D, which pass under and support the bottom of the popping-box, thus rendering the connections strong and not liable to break the wire cloth of the box.

Having described my improvements in corn-poppers,

BEST AVAILABLE COPY

What I claim therein as new and of my invention, and desire to secure by Letters Patent, is—

1. The combination, with the handle and popper-box, of a coiled-wire socket or ferrule, whereby the handle can be easily and conveniently attached and detached, for the purposes stated.

2. The combination of the wire socket or ferrule and its connections with the popping-box in such a manner that the strain, in lifting or using the popper, will be borne by the metal flange or binding around the upper edge of the popper and the wires which support and pass under the bottom of the popper-box.

3. The combination and connection of the coiled-wire socket or ferrule with the popping-box by means of wire connections.

4. The connection of the coiled-wire socket or ferrule with the metal flange or binding attached to the upper edge of the popping-box by two wire connections, which extend laterally from each other, in front of the socket, to the points where they are attached or hooked into the metal binding on the upper edge of the popping-box.

5. The combination, with the wire socket or ferrule and wooden handle, of a retaining-wire, substantially as described.

6. The combination, with the socket or ferrule and handle, of a shoulder on the latter, for the purposes as stated.

J. H. BIGELOW.

Witnesses:

GEO. H. MILLER,

ALBERT E. PEIRCE.